United States Patent
Jeung et al.

(10) Patent No.: US 8,811,916 B2
(45) Date of Patent: Aug. 19, 2014

(54) DUAL-STANDBY TERMINAL WITH A PLURALITY OF LOW-NOISE AMPLIFIERS AND METHOD FOR OPERATING WIRELESS COMMUNICATION UNIT THEREOF

(75) Inventors: Ki Suk Jeung, Gyeonggi-do (KR); Hyo Jeong Lee, Gyeonggi-do (KR); Chang Yong Oh, Gyeonggi-do (KR); Guen Su Lim, Gyeonggi-do (KR)

(73) Assignee: Samsung Electronics Co., Ltd., Yeongtong-gu, Suwon-si, Gyeonggi-do, (KR)

( * ) Notice: Subject to any disclaimer, the term of this patent is extended or adjusted under 35 U.S.C. 154(b) by 498 days.

(21) Appl. No.: 12/856,789

(22) Filed: Aug. 16, 2010

(65) Prior Publication Data
US 2011/0045867 A1   Feb. 24, 2011

(30) Foreign Application Priority Data
Aug. 18, 2009   (KR) .................. 10-2009-0076421

(51) Int. Cl.
*H04B 1/38* (2006.01)

(52) U.S. Cl.
USPC .......... 455/73; 455/67.13; 455/70; 455/552.1

(58) Field of Classification Search
CPC ....................................................... H04B 1/109
USPC ................ 455/73, 552.1, 67.13, 70
See application file for complete search history.

(56) References Cited

U.S. PATENT DOCUMENTS

| 5,722,063 | A  | * | 2/1998 | Peterzell et al. | ............. 455/287 |
| 2005/0075077 | A1 | * | 4/2005 | Mach et al. | ................. 455/67.13 |
| 2008/0146164 | A1 | * | 6/2008 | Rofougaran | .................... 455/73 |

* cited by examiner

*Primary Examiner* — Hsin-Chun Liao
(74) *Attorney, Agent, or Firm* — Cha & Reiter, LLC

(57) ABSTRACT

A dual-standby terminal and a method for operating wireless communication unit are disclosed. The dual-standby terminal includes: a plurality of wireless communication units; a plurality of low-noise amplifiers located on reception paths of the wireless communication units, respectively; and a controller. The controller enables all of the plurality of low-noise amplifiers when the dual-standby terminal performs a simultaneous call. The controller also enables part of the plurality of low-noise amplifiers when the dual-standby terminal performs a single call or is operated in a standby state.

17 Claims, 4 Drawing Sheets

DUAL-STANDBY TERMINAL WITH A PLURALITY OF LOW-NOISE AMPLIFIERS AND METHOD FOR OPERATING WIRELESS COMMUNICATION UNIT THEREOF

CLAIM OF PRIORITY

This application claims the benefit under 35 U.S.C. §119 (a) of a Korean patent application filed in the Korean Intellectual Property Office on Aug. 18, 2009 and assigned Serial No. 10-2009-0076421, the entire disclosure of which is hereby incorporated by reference.

BACKGROUND OF THE INVENTION

1. Field of the Invention

The present invention relates to communication systems, and more particularly, to a dual-standby terminal having a plurality of low-noise amplifiers and a method for operating wireless communication units thereof.

2. Description of the Related Art

In recent years, portable terminals have been developed to provide a variety of functions, such as a message transmission, a video call, an electronic note, an Internet function, etc., as well as a voice call. A dual-standby terminal is now available to provide a simultaneous call function with two or more wireless communication networks simultaneously. The dual-standby terminals can perform a simultaneous call connection between heterogeneous wireless networks as well as homogeneous wireless networks. For example, a dual-standby terminal can establish a simultaneous call between heterogeneous wireless networks (for example, CDMA-GSM networks) as well as homogeneous wireless networks (for example, GSM-GSM networks). To this end, the dual-standby terminal includes a plurality of wireless communication units.

If a dual-standby terminal with a plurality of wireless communication units performs a simultaneous call, the plurality of wireless communication units is activated. In that case, the transmission power of a first wireless communication unit may affect the reception path of a second wireless communication unit. As a result, the transmission power of the first wireless communication unit may cause the low-noise amplifier (LNA) of the second wireless communication unit to be saturated or oscillated, thereby deteriorating the reception performance of the second wireless communication unit. Moreover, since the transmission power of the first wireless communication unit increases relatively in a weak electrical field area, it may further deteriorate the reception performance of the second wireless communication unit. To resolve this problem, a plurality of low noise amplifiers may be serially connected to each other along the reception path of the wireless communication unit. However, this type of configuration causes increased power consumption in a battery. Therefore, there is a need for a system to enhance the call quality when a dual-standby terminal performs a simultaneous call connection and reduce power consumption of the battery.

SUMMARY OF THE INVENTION

The present invention has been made in view of the above problems, and provides a dual-standby terminal that can activate a plurality of low noise amplifiers when a simultaneous call is performed, thereby improving the call quality. Further, a part of the plurality of low noise amplifiers is selectively activated during a single call or in a standby state, thereby reducing power consumption of the battery.

In accordance with an exemplary embodiment of the present invention, the present invention provides a method for operating wireless communication units in a dual-standby terminal having a plurality of wireless communication units, each wireless communication unit coupled to a plurality of low-noise amplifiers, the method including: determining, if a request for call is a simultaneous call; and enabling all of the plurality of low-noise amplifiers to establish a first reception path if the requested call is a simultaneous call.

In accordance with another exemplary embodiment of the present invention, the present invention provides a dual-standby terminal including: a plurality of wireless communication units; a plurality of low-noise amplifiers coupled to reception paths of each wireless communication unit; and a controller for enabling all of the plurality of low-noise amplifiers when the dual-standby terminal performs a simultaneous call, or part of the plurality of low-noise amplifiers when the dual-standby terminal performs a single call or operates in a standby state.

BRIEF DESCRIPTION OF THE DRAWINGS

The above and other aspects, features and advantages of certain exemplary embodiments of the present invention will become more apparent from the following description taken in conjunction with the accompanying drawing, in which.

DETAILED DESCRIPTION OF THE INVENTION

Figure 1:
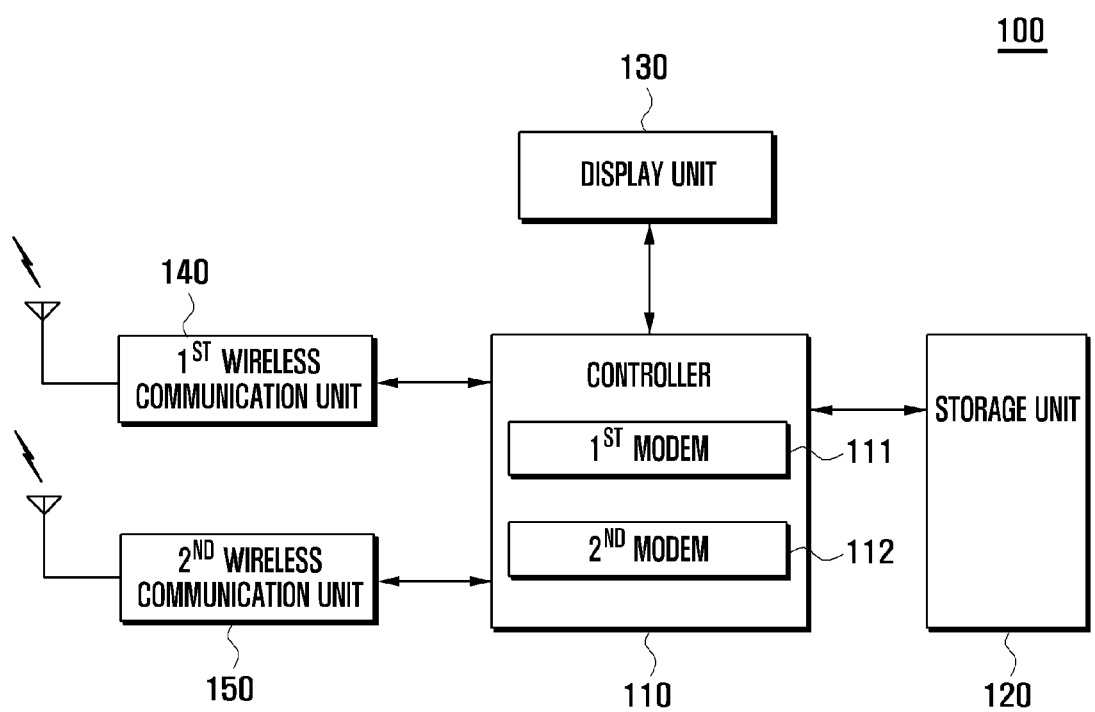
FIG. 1 is a schematic block diagram illustrating a dual-standby terminal according to an embodiment of the present invention.

Hereinafter, exemplary embodiments of the present invention are described in detail with reference to the accompanying drawings. For the purposes of clarity and simplicity, detailed descriptions of well-known functions and structures incorporated herein may be omitted to avoid obscuring the subject matter of the present invention.

The terms or words described in the present description and the claims should not be limited by a general or lexical meaning, instead should be analyzed as a meaning and a concept through which the inventor defines and describes the present invention at his most effort, to comply with the idea of the present invention. Therefore, one skilled in the art will understand that the embodiments disclosed in the description and configurations illustrated in the drawings are only preferred embodiments, instead there may be various modifications, alterations, and equivalents thereof to replace the embodiments at the time of filing this application.

The term 'dual-standby terminal' refers to a terminal that can perform a simultaneous call and a call standby with at least two wireless communication networks, for examples, Code Division Multiple Access (CDMA), Global System for Mobile communication (GSM), General Packet Radio Service (GPRS), Enhanced Data GSM environment (EDGE), Universal Mobile Telecommunication System (UMTS), Wideband Code Division Multiple Access (WCDMA), etc.

To this end, the dual-standby terminal includes a plurality of wireless communication units. For illustrative purposes, the embodiment of the present invention is explained based on a dual-standby terminal that can be operated in GSM and CDMA modes, but should be noted that other combination of network may be applied.

Figure 2:
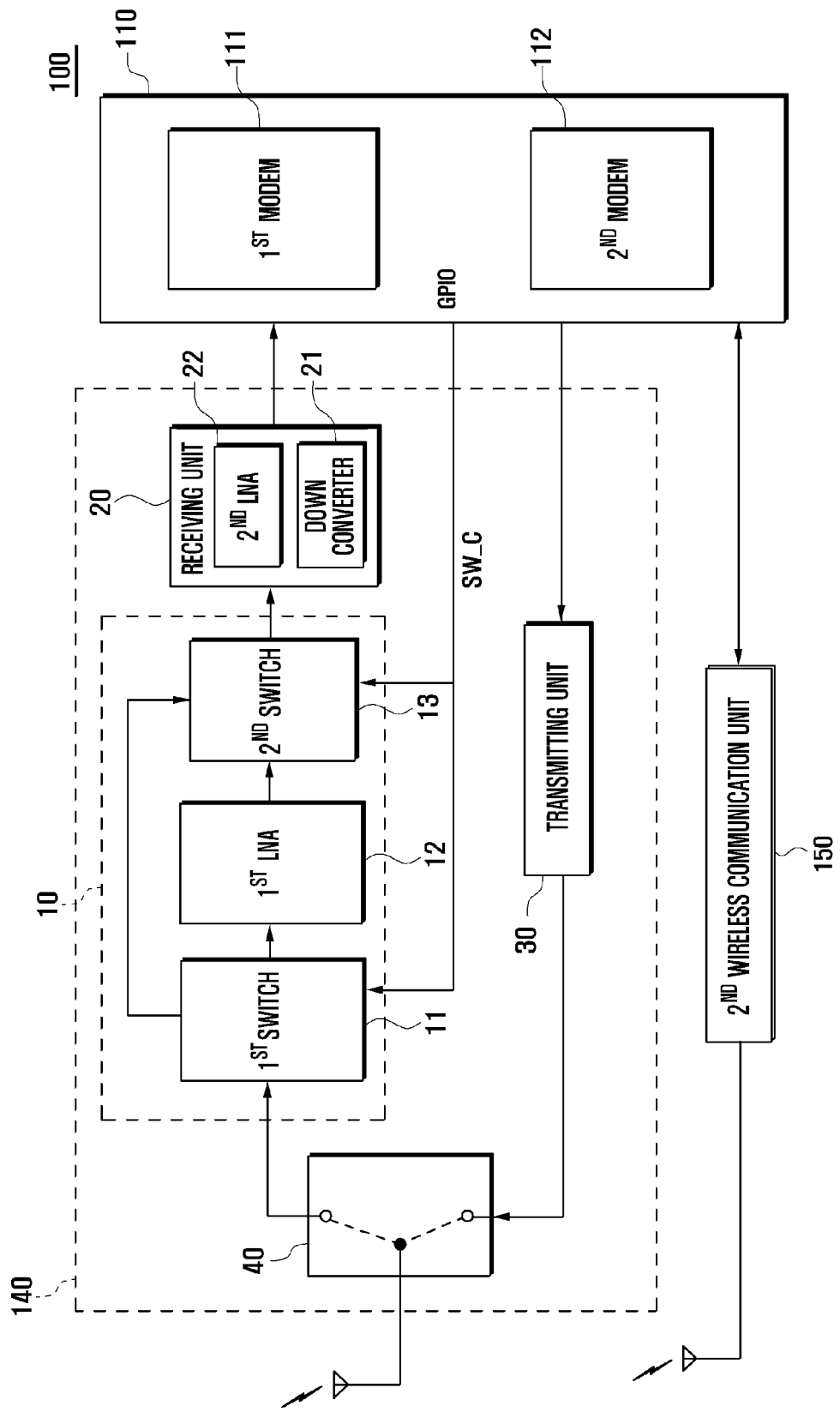
FIG. 2 is a detailed view illustrating the first wireless communication unit of the dual-standby terminal shown in FIG. 1.
Figure 3:
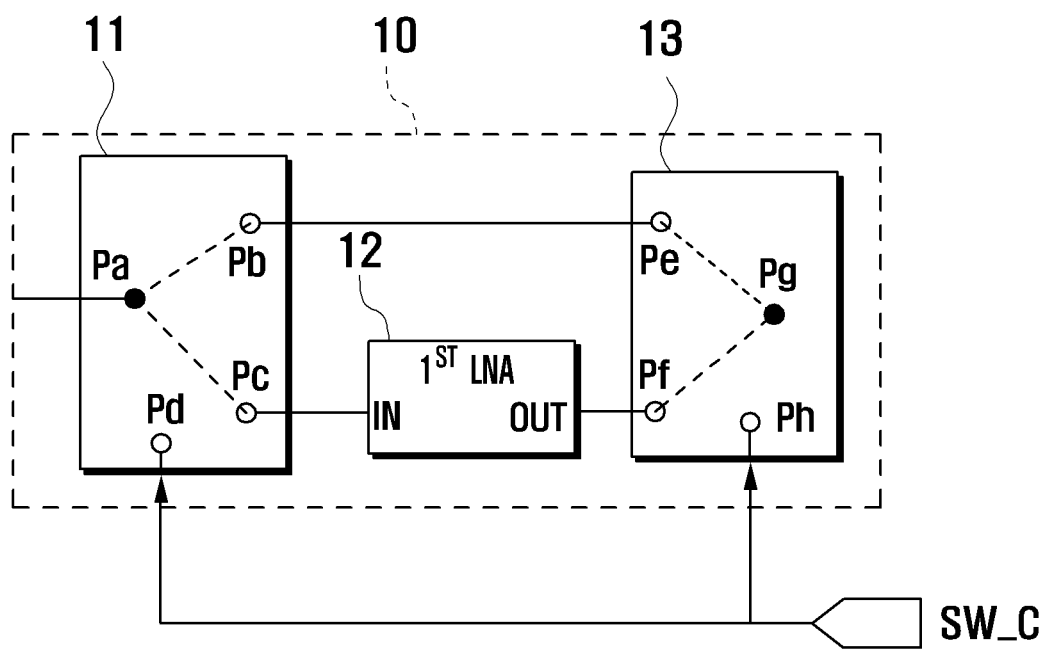
FIG. 3 is a detailed view illustrating a reception path control unit of the dual-standby terminal according to an embodiment of the present invention.

FIG. 1 is a schematic block diagram illustrating a dual-standby terminal 100 according to an embodiment of the present invention. FIG. 2 is a detailed view illustrating the first wireless communication unit 140 of the dual-standby terminal shown in FIG. 1. FIG. 3 is a detailed view illustrating a reception path control unit 10 of the dual-standby terminal according to an embodiment of the present invention.

Referring to FIGS. 1 to 3, the dual-standby terminal 100 includes a controller 110, a first wireless communication unit 140, a second wireless communication unit 150, a display unit 130, and a storage unit 120. The controller 110 includes a first modem 111 and a second modem 112. The first wireless communication unit 140 includes a transmission-reception separating unit 40, a transmitting unit 30, a reception path control unit 10, and a receiving unit 20. The reception path control unit 10 includes a first switch 11, a first low-noise amplifier (LNA) 12, and a second switch 13. The receiving unit 20 includes a second low-noise amplifier (LNA) 22 and a down converter 21.

In operation, the dual-standby terminal 100 activates the plurality of low noise amplifiers included in the wireless communication units when the wireless communication units are enabled, i.e., a simultaneous call is performed. The dual-standby terminal 100 also activates part of the plurality of low noise amplifiers during a single call or during a standby state. In the following description, each of the elements included in the dual-standby terminal 100 is explained in detail.

The storage unit 120 stores an operating system (OS) of the dual-standby terminal 100, and application programs for options, such as an audio playback function, an image or moving image reproducing function, a broadcast signal receiving function, etc. The storage unit 120 can also store user data. In the embodiment of the present invention, the storage unit 120 can store an application program for operating wireless communication units that can enable all or part of a plurality of low-noise amplifiers (not shown) according to the control of the controller 110.

In the embodiment of the present invention shown in FIG. 1, although it is implemented in such a way that there is one storage unit, it should be understood that the present invention is not limited to such embodiment. That is, the embodiment can be modified to include a number of storage units corresponding to the number of wireless communication modes.

The display unit 130 displays screens that are activated according to the functions of the dual-standby terminal 100. For example, the display unit 130 can display a booting screen, an idle state screen, a menu screen, a call screen, etc. The display unit 130 may be implemented with a liquid crystal display (LCD), an organic light emitted diode (OLED), etc. If the display unit 130 is implemented with a touch screen, it can also serve as an input device.

The first and second wireless communication units 140 and 150 transmit and receive voice signals for a call function and data for data communication to and from external systems according to the control of the controller 110. In the following embodiment, as an illustrative example, the first wireless communication unit 140 performs wireless communication in a CDMA mode, and the second wireless communication unit 150 is used to perform wireless communication in a GSM mode. It should be understood that the present invention is not limited to the CDMA and GSM modes. That is, the first and second wireless communication units 140 and 150 may also be designed to support various wireless communication modes, such as WCDMA, GPRS, EDGE, etc.

When the dual-standby terminal 100 performs a simultaneous call, the transmission frequency of the first wireless communication unit 140 may affect the reception path of the second wireless communication unit 150, or the frequency of the second wireless communication unit 150 may also affect the reception path of the first wireless communication unit 140. In this case, the transmission frequency affecting the reception path causes noise to deteriorate the reception performance. In particular, if the first and second wireless communication units 140 and 150 employ a similar frequency band, their reception performances are more seriously deteriorated. To resolve this problem, the first and second wireless communication units 140 and 150 include a plurality of low-noise amplifiers, respectively. That is, the first and second wireless communication units 140 and 150 activate all of the plurality of low noise amplifiers when a simultaneous call is performed under the control of the controller 110. They also activate part of the plurality of low noise amplifiers in a single call or in a standby state under the control of the controller 110.

Although FIG. 2 shows the configuration of the first wireless communication unit 140 for sake of convenience, it will be appreciated that the second wireless communication unit 150 can also be configured to be the same as the first wireless communication unit 140. That is, the second wireless communication unit 150 can also be configured to include a transmission-reception separating unit 40, a transmitting unit 30, a reception path control unit 10, and a receiving unit 20, as shown in FIG. 2.

As shown in FIG. 2, the transmission-reception separating unit 40 serves to separate signals transmitted from an antenna and the controller 110. The transmission-reception separating unit 40 is implemented with a duplexer, a diplexer, a switch, etc., according to the wireless communication modes. The transmitting unit 30 up-converts the frequency of signals transmitted from the controller 110, amplifies the signals, and outputs them to the transmission-reception separating unit 40. To this end, the transmitting unit 30 includes an up-converter (not shown) for up-converting the frequency of signals to be transmitted and a power amplifier (not shown) for amplifying the frequency-converted signals.

The reception path control unit 10 is disposed between the transmission-reception separating unit 40 and the receiving unit 20, and controls the path receiving the signal from the transmission-reception separating unit 40. To this end, as shown in FIG. 2, the reception path control unit 10 includes a first switch 11, a first low-noise amplifier (LNA) 12, and a second switch 13.

As shown in FIG. 3, the first switch 11 is a SPxT switch that selectively connects one contact to one of a plurality of contacts according to the control signal. In the embodiment of the present invention, the first switch 11 controls the path of a reception signal transmitted from the transmission-reception separating unit 40 according to a control signal SW_C output from the controller 110. The first switch 11 has one input contact Pa, two output contacts Pb and Pc, and one control contact Pd. That is, the first switch 11 is connected to the transmission-reception separating unit 40 via the input contact Pa, to an input contact In of the first low-noise amplifier 12 via the first output contact Pc, to a second input contact Pe of the second switch 13 via the second output contact Pb, and to a control port GPIO of the controller 110 via the control contact Pd. The first switch 11 connects its input contact Pa to the first output contact Pc or the second output contact Pb according to the control signal SW_C. In particular, when the dual-standby terminal 100 makes a simultaneous call, the first switch 11 is enabled and connects the input contact Pa to the first output contact Pc. Likewise, when the dual-standby terminal 100 makes an individual call or operated in a standby mode, the first switch 11 is disenabled and connects the input contact Pa to the second output contact Pb. On the other hand, when the dual-standby terminal 100 makes a simultaneous call, the first switch 11 is disenabled and connects the input contact Pa to the second output contact Pc. Likewise, when the dual-standby terminal 100 makes an individual call or operated in a standby mode, the first switch 11 is enabled and connects the input contact Pa to the first output contact Pb.

The first low-noise amplifier (LNA) 12 can low-noise-amplify signals received when a reception function is activated. In the embodiment of the present invention, the first LNA 12 is provided between the first switch 11 and the second switch 13. The first LNA 12 low-noise-amplifies a signal output from the first output contact Pc of the first switch 11 and outputs it to the first input contact Pf of the second switch 13. The first LNA 12 can be only enabled when the dual-standby terminal 100 performs a simultaneous call in a scheme to preserve the power consumption.

As shown in FIG. 3, like the first switch 11, the second switch 13 is a SPxT switch that selectively connects one contact to one of a plurality of contacts according to the control signal. In the embodiment of the present invention, the second switch 13 is connected to the output contact OUT of the first low-noise amplifier 12 via the first input contact Pf, to the second output contact Pb of the first switch 11 via the second input contact Pe, to the receiving unit 20 via the output contact Pg, and to a control port GPIO of the controller 110 via the control contact Ph. The second switch 13 connects one of the first and second input contacts Pf and Pe to the output contact Pg, according to the control signal SW_C of the controller 110.

In particular, when the dual-standby terminal 100 makes a simultaneous call, the second switch 13 is enabled and connects the first input contact Pf to the output contact Pg. Likewise, when the dual-standby terminal 100 makes an individual call or is operated in a standby mode, the second switch 13 is disenabled and connects the second input contact Pe to the output contact Pg. On the other hand, when the dual-standby terminal 100 makes a simultaneous call, the second switch 13 is disenabled and connects the second input contact Pe to the output contact Pg. Likewise, when the dual-standby terminal 100 makes an individual call or is operated in a standby mode, the second switch 13 is enabled and connects the first input contact Pf to the output contact Pg. That is, the second switch 13 can transfer one of the signals, output from the second output contact Pb of the first switch 11 and the output contact OUP of the first low-noise amplifier 12, to the receiving unit 20.

The receiving unit 20 low-noise-amplifies a signal output from the second switch 13, down-converts its frequency, and outputs the signal to the first modem 111 of the controller 110. To this end, as shown in FIG. 2, the receiving unit 20 includes a second low-noise amplifier 22 for low-noise-amplifying a received signal and a down converter 21 for down-converting the frequency of the low-noise-amplified signal. Since the configuration of the receiving unit 20 is well-known to the person skilled in the art, its detailed description is omitted in the application.

The controller 110 controls the entire operation of the dual-standby terminal 100. It also controls the signal flow among the elements in the dual-standby terminal 100. In the embodiment of the present invention, the controller 110 includes the first and second modems 111 and 112. The first and second modems 111 and 112 demodulate received signals into voice signals or data. They can also modulate the voice signals and data into modulated signals to be transmitted. The first modem 111 receives a signal from the first wireless communication unit 140 and demodulates it. The first modem 111 also modulates a signal to be transmitted and outputs the modulated signal to the first wireless communication unit 140. For example, the first modem 111 is implemented with a CDMA modem. Likewise, the second modem 112 receives a signal from the second wireless communication unit 150 and demodulates it. The second modem 112 also modulates a signal to be transmitted and outputs the modulated signal to the second wireless communication unit 150. For example, the second modem 112 is implemented with a GSM modem.

The controller 110 determines whether the first and second modems 111 and 12 are enabled. If the controller 110 ascertains that both the first and second modems 111 and 112 are enabled, it concludes that the mode is a simultaneous call. In that case, the controller 110 performs a control operation so that the first and second wireless communication units 140 and 150 can enable all the low-noise amplifiers included therein respectively.

On the contrary, if the controller 110 ascertains that one of the first and second modems 111 and 112 is enabled, which represents a single call, or both the first and second modems 111 and 112 are disenabled, which represents a standby state, it performs a control operation so that part of the plurality of low-noise amplifiers, for example one low-noise amplifier, can be enabled. In that case, the controller 110 outputs a control signal SW_C for controlling a reception path to the reception path control unit 10. The control signal SW_C is input to the controls contacts Pd and Ph of the first and second switches 11 and 13, respectively. To this end, the controller 110 has a control port GPIO for outputting the control signal SW_C.

In a simultaneous call, the controller 110 controls the first and second switches 11 and 13 and establishes a first reception path passing through: the transmission-reception separating unit 40 connected to an antenna; the first switch 11 whose input contact Pa is connected to the reception contact of the transmission-reception separating unit 40; the first low-noise amplifier 12 connected to the first output contact Pc of the first switch 11; the second switch 13 whose first input contact Pf is connected to the first low-noise amplifier 12; and the second low-noise amplifier 22 connected to the output contact Pg of the second switch 13.

During a simultaneous call, the controller 110 controls the reception path so that the first low-noise amplifier 12 low-noise-amplifies a received signal and the second low-noise amplifier 13 low-noise-amplifies the low-noise-amplified signal again, thereby enhancing the reception performance. Likewise, in a single call or in a standby state, the controller 110 controls the first and second switches 11 and 13 and establishes a second reception path passing through: the transmission-reception separating unit 40 connected to an antenna; the first switch 11 whose input contact Pa is connected to the reception contact of the transmission-reception separating unit 40; the second switch 13 whose second input contact Pe is connected to the second output contact Pb of the first switch 11; and the second low-noise amplifier 22 connected to the output contact Pg of the second switch 13. During the single call or the standby state, the controller 110 can disenable the first low-noise amplifier 12. That is, the controller 110 can activate only the second low-noise amplifier 22 during the single call or the standby state, thereby reducing the power consumption of the battery.

The controller 110 determines whether one of the simultaneous calls is terminated. If the controller 110 ascertains that one of the simultaneous calls is terminated and the dual-standby terminal 100 performs a single call or is operated in a standby state, it enables only part of the plurality of low-noise amplifiers to reduce the power consumption of the battery. That is, if one of the simultaneous calls is terminated, the controller 110 can switch the first reception path to the second reception path.

In the foregoing embodiment, although it is implemented in such a way that the number of controllers is one, it should be understood that the present invention is not limited to the embodiment. That is, the embodiment can be modified in such a way to include a plurality of controllers corresponding to the number of wireless communication modes. In that case, the modification is configured so that one of the plurality of controllers is a primary controller and the remaining controllers are sub-controllers.

In addition, if the modification is configured in such a way that the plurality of controllers is operated in different wireless communication modes, it may further include an intermediate communication processor (not shown), for example, a dual port RAM. The dual-standby terminal 100 may further include a camera module for capturing images or moving images, a short-range communication module for short-range wireless communication, a broadcast receiver module for receiving broadcasts, a digital audio source reproducing module such as an MP3 player module, an Internet communication module for performing communication via the Internet, etc. With the convergence of digital devices, there may be many digital devices and modifications thereof, not listed in the application, and, it will be appreciated that they can also be included in the dual-standby terminal.

In the foregoing description, the configuration of the dual-standby terminal 100 has been explained. Now, a description of operating wireless communication units of the dual-standby terminal 100 will be explained with reference to FIG. 4.

Figure 4:
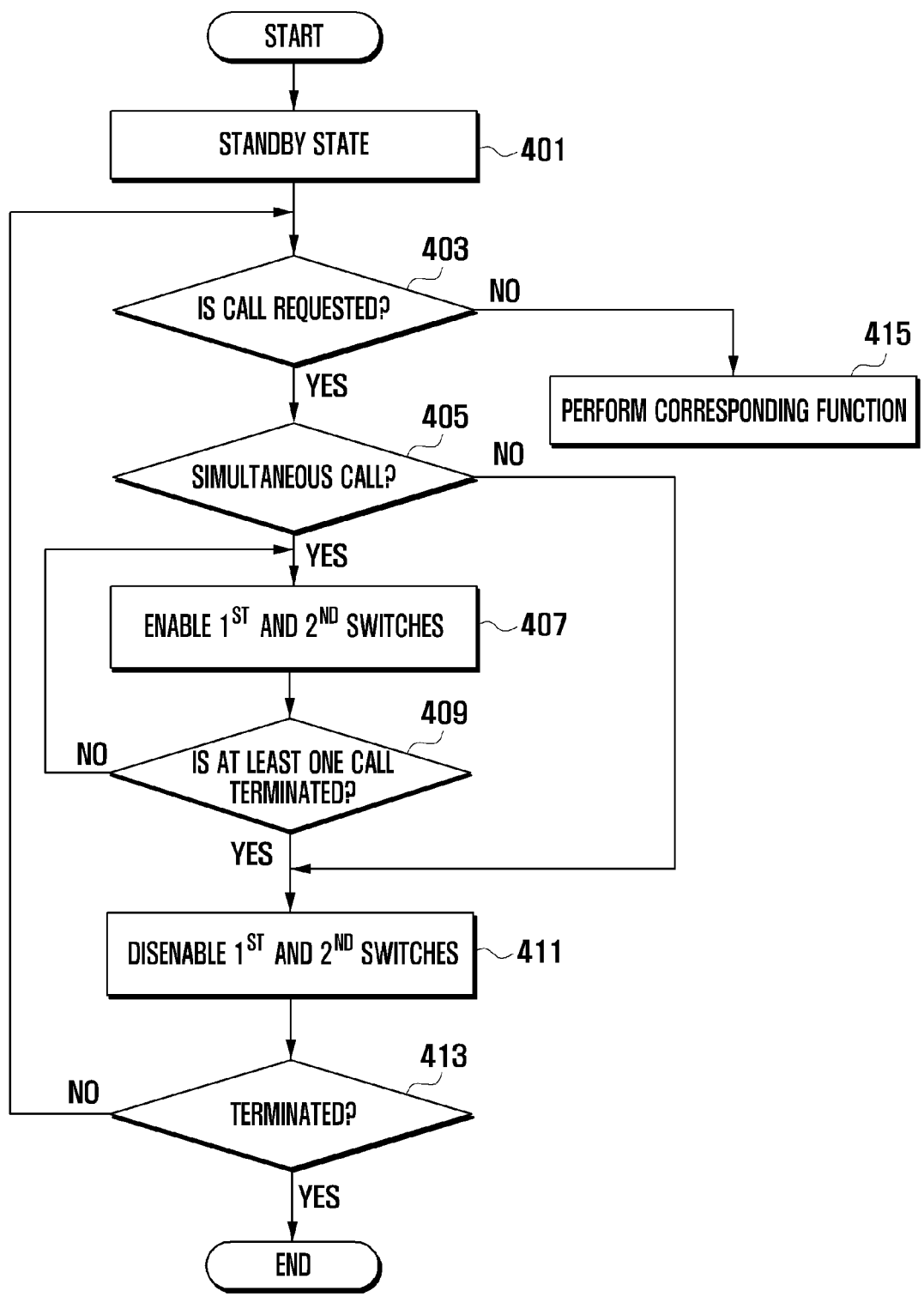
FIG. 4 is a flow chart that describes a method for operating wireless communication units of the dual-standby terminal according to an embodiment of the present invention.

FIG. 4 is a flow chart that describes a method for operating wireless communication units of the dual-standby terminal 100 according to an embodiment of the present invention. The following embodiment is explained based on the first wireless communication unit 140 as an illustrative example.

Referring to FIGS. 1 to 4, the controller 110 is operated in a standby state (401). During the standby state, the controller 110 controls the first wireless communication unit 140 to establish the second reception path.

The controller 110 determines whether a call is requested (a call request reception and a call request transmission) (403). If the controller 110 ascertains that a call is not requested at step 403, it performs a corresponding function (415). Examples of the corresponding function are a music playback function, a message writing function, a camera function, etc. On the contrary, if the controller 110 ascertains that a call is requested at step 403, it determines whether a requested call corresponds to a simultaneous call (405). The simultaneous call refers to a state where at least two or more wireless communication units are enabled. An example of the simultaneous call is a case where a call is requested via a wireless communication unit while a call is being performed by another wireless communication unit or a call request is being transmitted by another wireless communication unit.

If the controller 110 ascertains that a request call corresponds to a simultaneous call at step 405, it enables the first and second switches 11 and 13 (407). That is, the controller 110 establishes the first reception path by enabling all of the plurality of low-noise amplifiers included in the first wireless communication unit 140. The first reception path is established via: the transmission-reception separating unit 40 connected to an antenna; the first switch 11 whose input contact Pa is connected to the reception contact of the transmission-reception separating unit 40; the first low-noise amplifier 12 connected to the first output contact Pc of the first switch 11; the second switch 13 whose first input contact Pf is connected to the first low-noise amplifier 12; and the second low-noise amplifier 22 connected to the output contact Pg of the second switch 13.

Thereafter, the controller 110 determines whether at least one of the calls is terminated (409). If the controller 110 ascertains that at least one of the calls is not terminated at step 409, it returns to and proceeds with step 407.

On the contrary, if the controller 110 ascertains that at least one of the calls is terminated, i.e., the dual-standby terminal 100 performs a single call or is operated in a standby state, at step 409, it disenables the first and second switches 11 and 13 and establishes the second reception path where part of the plurality of low-noise amplifiers are enabled (411). The second reception path is established via: the transmission-reception separating unit 40 connected to an antenna; the first switch 11 whose input contact Pa is connected to the reception contact of the transmission-reception separating unit 40; the second switch 13 whose second input contact Pe is connected to the second output contact Pb of the first switch 11; and the second low-noise amplifier 22 connected to the output contact Pg of the second switch 13. Meanwhile, if the controller 110 ascertains that a request call does not correspond to a simultaneous call at step 405, it also proceeds with step 411.

After establishing the second reception path at step 411, the controller 110 determines whether a termination signal is input (413). If the controller 110 ascertains that a termination signal is input at step 413, it terminates the procedure. Otherwise, the controller 110 returns to and proceeds with step 403.

It should be noted that the above-described method according to the present invention can be realized in hardware or as software or computer code that can be stored in a recording medium such as a CD ROM, an RAM, a floppy disk, a hard disk, or a magneto-optical disk or downloaded over a network, so that the methods described herein can be executed by such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

As described above, the method for operating wireless communication units of the dual-standby terminal with a plurality of low-noise amplifiers includes: determining whether a call request is a simultaneous call where at least two wireless communication units are enabled; and activating at least one of the plurality of low-noise amplifiers based on the determination. If a request call is a simultaneous call, a first reception path is established by activating all of the plurality of low-noise amplifiers. If a request call is a single call or the dual-standby terminal is operated in a standby mode, part of the plurality of low-noise amplifiers is activated. If at least one of the calls is terminated while a simultaneous call is being performed, the first reception path is switched to the second reception path.

The following description is provided regarding the test result of reception capability between the dual-standby terminal according to the present invention and the conventional dual-standby terminal, with reference to table 1. The term 'reception capability' refers to the minimum intensity of a received signal that can be received and demodulated by a communication module. If the dual-standby terminal has a reception capability of −90 dB, it can demodulate a signal whose intensity reaches a minimum of −90 dB. On the contrary, if the dual-standby terminal has a reception capability less than −90 dB, for example, −91 dB, it cannot demodulate a signal or can demodulate only part of the signal because the signal has errors. The unit of the reception capability is dB and is omitted in the table 1 for sake of convenience. The reception capability test is conducted after a call channel is established between the respective dual-standby terminal and a simulator for measuring a reception capability in an anti-reflection chamber. To acquire more precise results, the reception capability test is conducted with respect to various channels. That is, the test is conducted with respect to CDMA reception capability when a dual-standby terminal, capable of being operated in CDMA-GSM wireless communication, makes a CDMA single call and a CDMA-GSM simultaneous call.

GSM channel 999). For example, if the dual-standby terminal according to the present invention performs CDMA wireless communication via CDMA channel 1011 and GSM wireless communication via GSM channel 999, it deteriorates by 15 dB in reception capability. If the dual-standby terminal according to the present invention performs CDMA wireless communication via CDMA channel 1011 and GSM wireless communication via GSM channel 50, it deteriorates by 6.5 dB in reception capability. Likewise, in a state where the first low-noise amplifier has a low gain, the dual-standby terminal according to the present invention deteriorates in reception capability by more than the conventional dual-standby terminal does, in a particular channel (for example, GSM channel 124). For example, if the dual-standby terminal according to the present invention performs CDMA wireless communication via CDMA channel 1011 and GSM wireless communication via GSM channel 50, it deteriorates by 8.5 dB in reception capability. If the dual-standby terminal according to the present invention performs CDMA wireless communication via CDMA channel 1011 and GSM wireless communication via GSM channel 124, it deteriorates by 0.5 dB in reception capability. Therefore, the dual-standby terminal may also perform a control operation so that the first low-

TABLE 1

| CDMA CH | GSM CH | conventional terminal | | terminal of the present invention (High Gain) | | terminal of the present invention (Low Gain) | |
| --- | --- | --- | --- | --- | --- | --- | --- |
| | | CDMA single call | simultaneous call | CDMA single call | simultaneous call | CDMA single call | simultaneous call |
| 1011 | 999 | −72.5 | −46.5 | −73.5 | −58.5 | −67.0 | −40.0 |
| | 50 | | −54.0 | | −67.0 | | −58.5 |
| | 124 | | −71.0 | | −71.5 | | −66.5 |
| 283 | 999 | −72.5 | −55.5 | −73.5 | −64.5 | −68.0 | −47.0 |
| | 50 | | −54.5 | | −65.0 | | −60.5 |
| | 124 | | −70.5 | | −70.5 | | −67.0 |
| 333 | 999 | −73.5 | −58.5 | −75.0 | −68.5 | −69.5 | −51.5 |
| | 50 | | −52.5 | | −64.0 | | −60.5 |
| | 124 | | −71.0 | | −71.5 | | −68.0 |
| 779 | 999 | −71.5 | −50.0 | −72.5 | −60.0 | −66.5 | −43.0 |
| | 50 | | −52.0 | | −63.0 | | −58.0 |
| | 124 | | −68.5 | | −69.5 | | −66.0 |

Referring to tale 1, if a single call is conducted by the dual-standby terminal according to the present invention and the conventional dual-standby terminal, their reception capability is similar to each other when the first low-noise amplifier has a high gain but is lowered when the first low-noise amplifier has a low gain. Therefore, it is preferable that the dual-standby terminal according to the present invention controls the first and second switches and enables one low-noise amplifier when it performs a single call. However, the conventional terminal deteriorates by approximately 20 dB in reception capability when it performs a simultaneous call. For example, if the conventional terminal performs CDMA wireless communication via CDMA channel 1011 and GSM wireless communication via GSM channel 999, it deteriorates by 26 dB in reception capability. If the conventional terminal performs CDMA wireless communication via CDMA channel 1011 and GSM wireless communication via GSM channel 50, it deteriorates by 18.5 dB in reception capability. On the contrary, in a state where the first low-noise amplifier has a high gain when a simultaneous call is performed, the dual-standby terminal according to the present invention deteriorates more in reception capability than the conventional dual-standby terminal does, in a particular channel (for example, noise amplifier has a high or low gain according to channels when a simultaneous call is performed.

It should be understood that table 1 shows test data and this does not limit the present invention. That is, it will be appreciated that the test data in the table 1 may be changed according to the test conditions.

As described above, the present invention can prevent the reception capability from deteriorating when a simultaneous call is performed, thereby enhancing the call quality. In addition, the present invention can activate part of a plurality of low-noise amplifiers in a single call or in a standby state, thereby preventing power consumption of a battery.

Although the invention has been shown and described with respect to exemplary embodiments thereof, it should be understood that these embodiments are only illustrative and not intended to limit the scope of the invention. Therefore, one skilled in the art will understand that the embodiments disclosed in the description and configurations illustrated in the drawings are only preferred embodiments, instead there may be various modifications, alterations, and equivalents thereof, without departing from the scope and spirit of the invention as described in the accompanying claims.

What is claimed is:

1. A dual-standby terminal comprising:
a plurality of wireless communication units of which at least two wireless communication units are configured for communication with respectively different networks;
a plurality of low-noise amplifiers coupled to respective reception paths of each wireless communication unit in which for each respective wireless communication unit of the plurality of wireless communication units, the plurality of low-noise amplifiers are selectively activated by respective wireless communications units so that part of the plurality of low noise amplifiers remain enabled while the remainder of the plurality of low-noise amplifiers are disabled; and
a controller for enabling all of the plurality of low-noise amplifiers that are connected in a serial connection when the dual-standby terminal performs a simultaneous call with respectively different networks, and for enabling only part of the plurality of low-noise amplifiers in which a remainder of the plurality of low-noise amplifiers are bypassed when the dual-standby terminal performs a single call or operates in a standby state.

2. The dual-standby terminal of claim 1, wherein the controller further comprises a first modem coupled to receive an output of a first wireless communication unit and a second modem coupled to receive an output of a second wireless communication unit, wherein the first and second modems are enabled during the simultaneous call.

3. The dual-standby terminal of claim 2, wherein one of the first and second modems is enabled during the single call.

4. The dual-standby terminal of claim 2, wherein one of the first and second modems is enabled during the standby state.

5. The dual-standby terminal of claim 1, wherein the plurality of low-noise amplifiers comprise a first low-noise amplifier and a second low-noise amplifier, the controller enables the first low-noise amplifier and the second low-noise amplifier to amplify a signal received therein twice during the simultaneous call.

6. The dual-standby terminal of claim 5, wherein the controller disables the first low-noise amplifier and activates the second low-noise amplifier during the single call or the standby state.

7. The dual-standby terminal of claim 1, wherein each of the plurality of wireless communication units comprises:
a transmission-reception separating unit for controlling a transmission path and a reception path;
a reception path control unit for controlling a path of a received signal output from the transmission-reception separating unit;
a receiving unit for low-noise-amplifying the received signal and down-converting the frequency of the received signal; and
a transmitting unit for up-converting the frequency of a signal to be transmitted and amplifying the signal to be transmitted.

8. The dual-standby terminal of claim 7, wherein the reception path control unit comprises:
a first switch whose input contact is coupled to a reception contact of the transmission-reception separating unit;
a first low-noise amplifier coupled to a first output contact of the first switch; and
a second switch whose first input contact is coupled to the first low-noise amplifier, whose second input contact is coupled to the second output contact of the first switch, and whose output contact is coupled to the receiving unit,
wherein the first and second switches are coupled, via their control contact, to a control port of the controller, through which the controller outputs a reception path control signal.

9. The dual-standby terminal of claim 8, wherein the receiving unit comprises:
a second low-noise amplifier for low-noise-amplifying the received signal; and
a down-converter for down-converting the frequency of the received signal.

10. The dual-standby terminal of claim 9, wherein: the controller establishes a first reception path when a simultaneous call is performed; and
the first reception path is established via: the transmission-reception separating unit connected to an antenna; the first switch whose input contact is connected to the reception contact of the transmission-reception separating unit; the first low-noise amplifier coupled to the first output contact of the first switch; the second switch whose first input contact is coupled to the first low-noise amplifier; and the second low-noise amplifier connected to the output contact of the second switch.

11. The dual-standby terminal of claim 9, wherein: the controller establishes a second reception path when the dual-standby terminal performs a single call or is operated in a standby mode; and
the second reception path is established via: the transmission-reception separating unit connected to an antenna; the first switch whose input contact is coupled to the reception contact of the transmission-reception separating unit; the second switch whose second input contact is coupled to the second output contact of the first switch; and the second low-noise amplifier coupled to the output contact of the second switch.

12. The dual-standby terminal of claim 1, wherein the controller enables part of the plurality of low-noise amplifiers if at least one of the calls during the simultaneous call is terminated.

13. A method for operating wireless communication units in a dual-standby terminal having a plurality of wireless communication units of which at least two wireless communication units are configured for communication with respectively different networks, each wireless communication unit coupled to a plurality of low-noise amplifiers, the method comprising:
determining, if a request for call is a simultaneous call; and
enabling all of the plurality of low-noise amplifiers to establish a first reception path in a serial connection if the requested call is a simultaneous call, and
determining whether at least one of the calls during the simultaneous call is terminated; and
enabling, if at least one of the calls during the simultaneous call is terminated, only part of the plurality of low-noise amplifiers and bypassing a remainder of the plurality of low-noise amplifiers.

14. The method of claim 13, wherein establishing the first reception path is establishing a path via: the transmission-reception separating unit coupled to an antenna; a first switch whose input contact is coupled to the reception contact of the transmission-reception separating unit; a first low-noise amplifier coupled to the first output contact of the first switch; a second switch whose first input contact is coupled to the first low-noise amplifier; and a second low-noise amplifier coupled to the output contact of the second switch.

15. The method of claim 13, further comprises:
enabling the low-noise amplifiers to establish a second reception path if the requested call is a single call or the dual-standby terminal is operated in a standby state.

16. The method of claim 13, wherein, during the single call or the standby state, a first low-noise amplifier is disabled and a second low-noise amplifier is activated.

17. The method of claim 15, wherein establishing the second reception path is establishing a path via: a transmission-reception separating unit connected to an antenna; a first switch whose input contact is coupled to the reception contact of the transmission-reception separating unit; a second switch whose second input contact is coupled to the second output contact of the first switch; and a second low-noise amplifier coupled to the output contact of the second switch.

* * * * *